US008246447B2

(12) United States Patent
Gauselmann

(10) Patent No.: US 8,246,447 B2
(45) Date of Patent: Aug. 21, 2012

(54) GAMING DEVICE HOLDING REELS WITH TRIGGER SYMBOLS AND PROVIDING FREE REEL SPINS

(75) Inventor: Michael Gauselmann, Espelkamp (DE)

(73) Assignee: Spielo International Austria GmbH, Lübbecke (DE)

( * ) Notice: Subject to any disclaimer, the term of this patent is extended or adjusted under 35 U.S.C. 154(b) by 954 days.

(21) Appl. No.: 11/311,962

(22) Filed: Dec. 19, 2005

(65) Prior Publication Data

US 2007/0155474 A1 Jul. 5, 2007

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ........................................... 463/25; 463/20

(58) Field of Classification Search .................... 463/20, 463/25

See application file for complete search history.

(56) References Cited

U.S. PATENT DOCUMENTS

| | | | | |
|---|---|---|---|---|
| 2003/0098544 | A1* | 5/2003 | Tarantino | 273/292 |
| 2004/0048650 | A1* | 3/2004 | Mierau et al. | 463/20 |
| 2006/0160613 | A1* | 7/2006 | Hornik et al. | 463/25 |
| 2006/0189378 | A1* | 8/2006 | Aoki | 463/20 |

* cited by examiner

*Primary Examiner* — Melba Bumgarner
*Assistant Examiner* — Jason Pinheiro
(74) *Attorney, Agent, or Firm* — Patent Law Group LLP; Brian D. Ogonowsky

(57) ABSTRACT

A game variation played on a gaming device displaying reels is disclosed. The game grants awards to the player for certain combinations of symbols. When a player gets one or more special symbols in an initial game, the player gets a free spin of one or more reels while the reels that display the special symbols are held. The player continues to get free spins as long as additional special symbols are displayed after each spin. The player may be granted awards for winning symbols combinations after each spin. In one embodiment, a certain number of special symbols across a payline awards the player a jackpot. In another embodiment, the game is a bonus game where any reels containing special, or trigger, symbols are shifted by one position after each free spin and then held for the next free spin. Only reels that do not display a trigger symbol are spun. The bonus game ends when there are no more trigger symbols displayed. The game may be played on a video gaming machine or a motor-driven reel machine. Various embodiments are described herein.

30 Claims, 5 Drawing Sheets

| | | | | |
|---|---|---|---|---|
| A | B | C | D | E |
| T1 | G | H | I | J |
| K | L | M | N | O |

First spin result.
Pay award

Fig. 4A

Shift reel 1 downward.
Hold reel 1 and spin
reels 2-5

| | | | | |
|---|---|---|---|---|
| G | D | H | J | E |
| A | M | O | L | A |
| T1 | B | C | E | G |

Second spin
result. Pay award.

Fig. 4B

Shift reel 1 downward.
Spin reels 1-5.

| | | | | |
|---|---|---|---|---|
| N | D | F | I | M |
| B | N | J | K | T2 |
| C | C | E | G | H |

Third spin result.
Pay award.

Fig. 4C

Shift reel 5 downward.
Hold reel 5. Spin reels
1-4.

| | | | | |
|---|---|---|---|---|
| M | G | A | B | K |
| J | M | E | K | M |
| C | N | K | E | T2 |

Fourth spin result.
Pay award.

Fig. 4D

GAMING DEVICE HOLDING REELS WITH TRIGGER SYMBOLS AND PROVIDING FREE REEL SPINS

FIELD OF THE INVENTION

This invention relates to video or mechanical reel-type slot machines and, in particular, to a symbol-matching game that can be played on such machines.

BACKGROUND

Conventional slot machines contain three or more reels, each reel having a set of symbols around its periphery. The reels are rotated and randomly stopped, and the combination of symbols across one or more paylines determines the award paid to the player. U.S. Pat. No. 5,839,957, incorporated herein by reference, describes an example of a mechanical reel-type slot machine. Video slot machines are also well known and present an image of virtual reels spinning and stopping.

To make the players' experience more exciting, various variations of rotating and stopping the reels have been used.

What is desirable is a variation on the conventional reel-type games to add further player excitement.

SUMMARY

A game variation played on a gaming device displaying reels is disclosed. The game grants awards to the player for certain combinations of symbols across activated paylines. In one embodiment, there are special symbols on the reels that initiate a special feature. It will be assumed that a special symbol is the symbol T (for trigger symbol). If a player's machine displays two T's, the player will get a free spin while the reels displaying the two T's remain fixed. The player also may get any instant award for any winning symbol combinations in the initial game.

If the free spin results in one or more additional T symbols, the player gets an additional free spin, and all the reels displaying the T's are fixed. The player is granted an award for winning symbol combinations after each free spin.

The free spins continue until the player ceases to get additional T symbols on the free spins.

In one embodiment, the player only gets a free spin if there are two or more adjacent trigger symbols starting from the leftmost reel. In one embodiment, only the reel adjacent to the last trigger symbol gets a free spin. If that free spin produces a trigger symbol, the next adjacent reel gets a free spin, etc. In other embodiments, there is no requirement for the trigger symbols to be adjacent for a free spin.

In one embodiment, the trigger symbols can award the player a jackpot if all reels display trigger symbols across a payline. In one embodiment, there are multiple jackpots, and the player gets a first jackpot for three adjacent trigger symbols starting from the leftmost reel, a second jackpot for four adjacent trigger symbols starting from the leftmost reel, and a maximum jackpot for five adjacent trigger symbols.

In another embodiment, the trigger symbol(s) moves down one position for each free spin and enables a free spin as long as the trigger symbol(s) remains on the screen. After a certain number of spins, the trigger symbol(s) moves off the screen and has no effect. The trigger symbol may be a scatter symbol, which can be combined with symbols on other paylines to win awards no matter where the scatter symbol is on the screen. If additional scatter symbols occur during the free spins, those new scatter symbols also enable a free spin as long as one scatter symbol still remains on the screen. The trigger symbol may be other than a scatter symbol, and may be a wild card, a high value symbol, or any other symbol.

The respin of the reels not displaying a trigger symbol can be performed either before or after the reel with the trigger symbol is moved down or up one space or position. If the free spin is performed after a shift and the trigger symbol is shifted off the screen, the shifted reel that had displayed that trigger symbol, but now does not display a trigger symbol, is spun like other reels that do not display a trigger symbol.

In all embodiments, the free spins may occur only during a bonus game. The bonus game may be enabled by obtaining a certain outcome during the main game, such as a certain combination of symbols.

The game may be played on a video gaming machine or a motor-driven reel machine. Various embodiments are described herein.

BRIEF DESCRIPTION OF THE DRAWINGS

FIGS. 4A-4D are sequential displays in a 3×5 matrix of reels where the player gets free spins as long as a trigger symbol is present, and where any reel displaying a trigger symbol is shifted by one position and held for the next spin.

DETAILED DESCRIPTION

Although the invention can typically be implemented by installing a software program in most types of modern gaming machines, one particular gaming machine platform will be described in detail.

Figure 1:
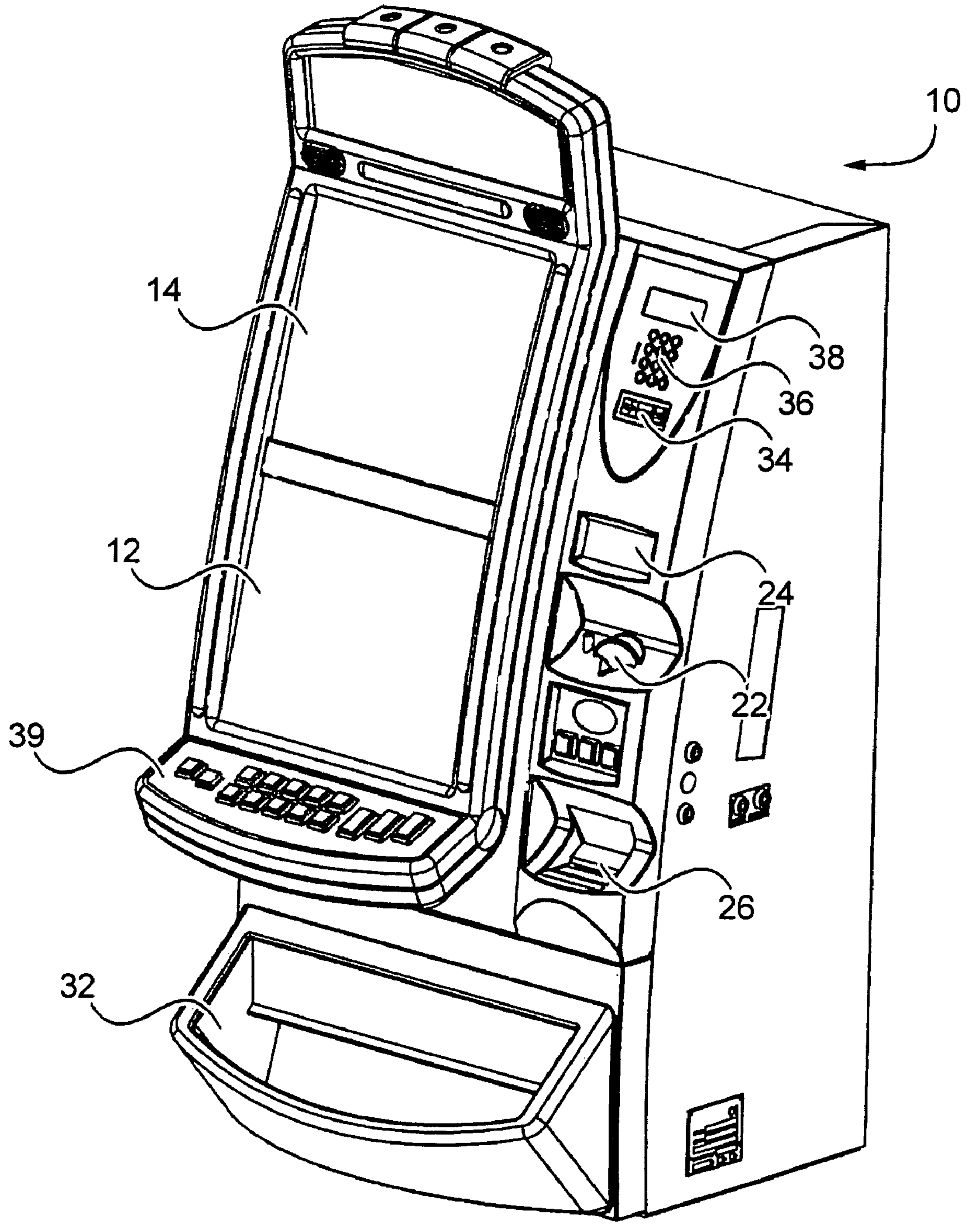
FIG. 1 is a perspective view of one example of a video slot machine programmed for performing the game of the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide static information, such as an advertisement for the game, the rules of the game, pay tables, paylines, or other information, or may even display the main game or the bonus game along with display 12. Alternatively, the area for display 14 may be a display glass for conveying information about the game.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 39 include any buttons needed for the play of the particular game or games offered by machine 10 including, for example, a bet button, a repeat bet button, a play two-ways button, a spin reels button, a deal button, hold cards buttons, a draw button, a maximum bet button, a cash-out button, a display paylines button, a display payout tables button, select icon buttons, and any other suitable button. Buttons 39 may be replaced by a touch screen with virtual buttons.

Figure 2:
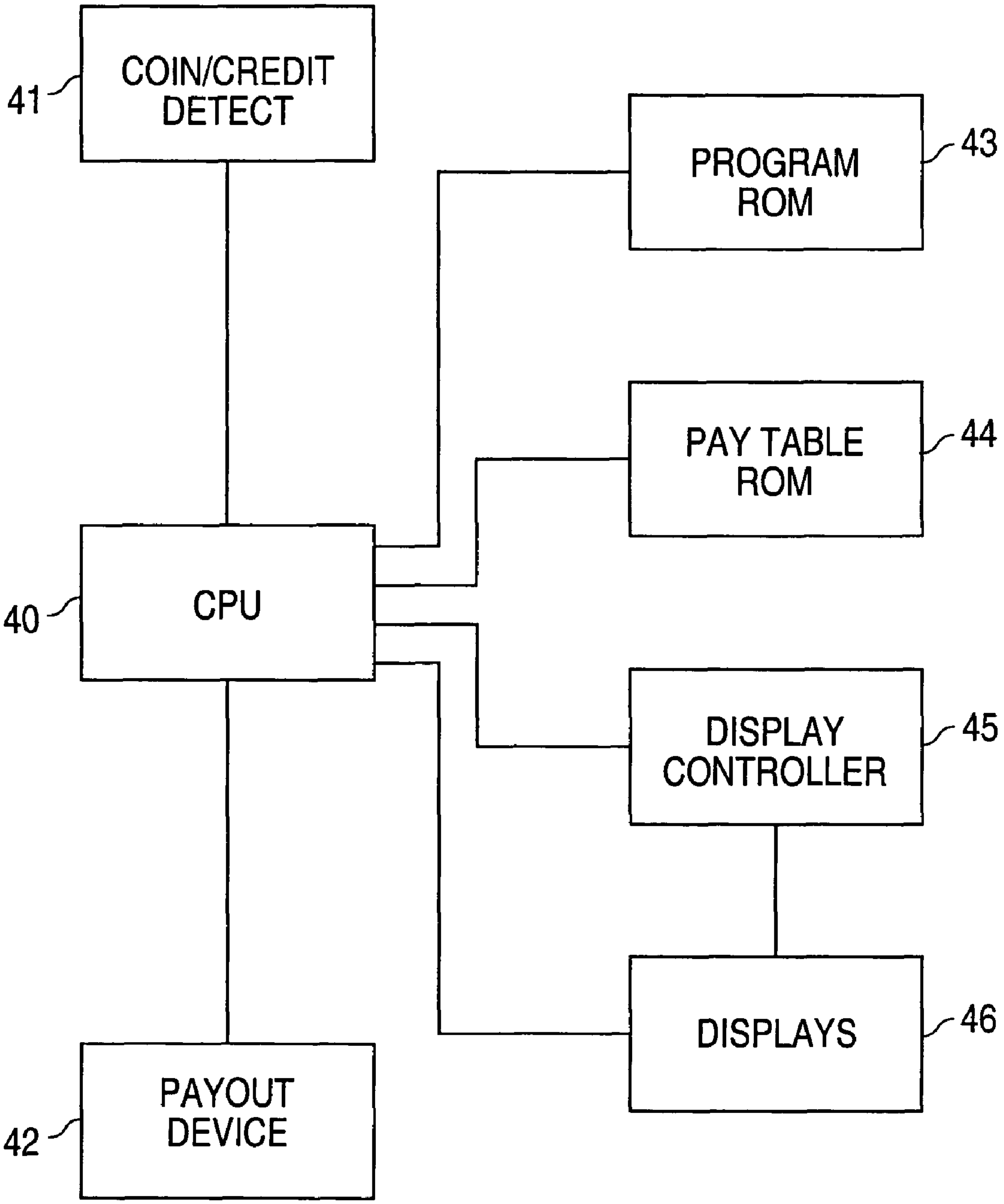
FIG. 2 is a schematic diagram of certain functional units in the slot machine of FIG. 1.

FIG. 2 illustrates basic circuit blocks in a suitable gaming device. A control unit (CPU 40) runs a gaming program stored in a program ROM 43. A coin/credit detector 41 enables the CPU 40 to initiate a next game. A pay table ROM 44 detects the outcome of the game and identifies awards to be paid to the player. A payout device 42 pays out an award to the player in the form of coins upon termination of the game or upon the player cashing out. A payout may also be in the form of a coded paper ticket, credits on a smart card or magnetic strip card, or in any other form. A display controller 45 receives commands from the CPU 40 and generates signals for the various displays 46. If a display 46 is a touch screen, player commands may be input through the display screen into the CPU 40.

FIGS. 3A-3E illustrate five reels displayed on display 12 in FIG. 1, although FIGS. 3A-3E could also represent motor-driven reels. In some embodiments, three or more symbols on each reel may be displayed simultaneously. The present invention may also be implemented on a 3-reel machine.

Figure 3A:
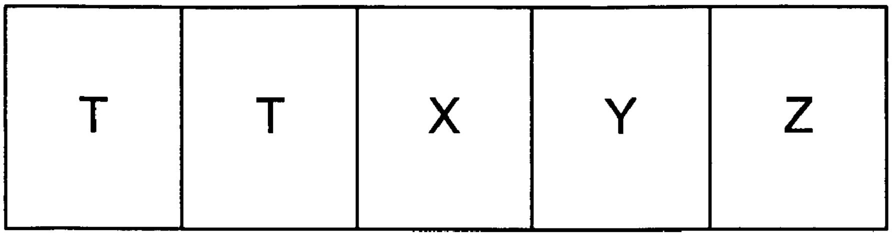
FIGS. 3A-3E are displays of five reels during a single game where the player gets free spins for obtaining trigger symbols.

In FIG. 3A, it is assumed the player has placed a bet, spun the reels, and the stopped reels display the symbols TTXYZ. It is assumed that five adjacent T symbols (trigger symbols) wins the jackpot (the maximum award). The software game rules specify that if the player gets two or more T symbols on the initial spin, the player gets a free spin, while the reels displaying the T symbols remain fixed. In another embodiment, the rules may specify that even if there is only one T symbol displayed, the player gets a free spin. In another embodiment, the rules specify that the player gets a free spin only if two or more T symbols begin on the leftmost reel and are adjacent. The rules may specify any variation of the general concept described herein.

The free spin may occur automatically or as a result of the player pulling a handle or pressing a button.

In one embodiment, the player receives an award for any winning symbol combination displayed after the initial spin of FIG. 3A. Winning symbol combinations may be determined from left-to-right, from right-to-left, or in any other sequence An award can be paid after each step or respin for a winning symbol combination.

In one embodiment, there are multiple jackpots, and the player gets a first level jackpot for three adjacent trigger symbols starting from the leftmost reel, a second level jackpot for four adjacent trigger symbols starting from the leftmost reel, and a maximum jackpot for five adjacent trigger symbols starting from the leftmost reel. Accordingly, the player may win three jackpots if all the spins are successful. In other embodiment, jackpots may also be awarded for right-to-left combinations or non-adjacent combinations.

Figure 3B:
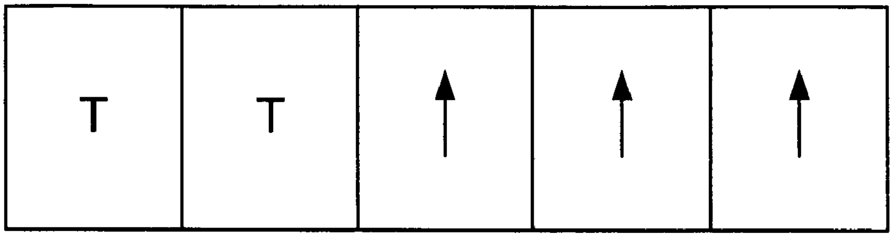

FIG. 3B illustrates the reels not displaying the trigger symbol T spinning during the free spin time. In another embodiment, only the third reel gets a free spin.

Figure 3C:
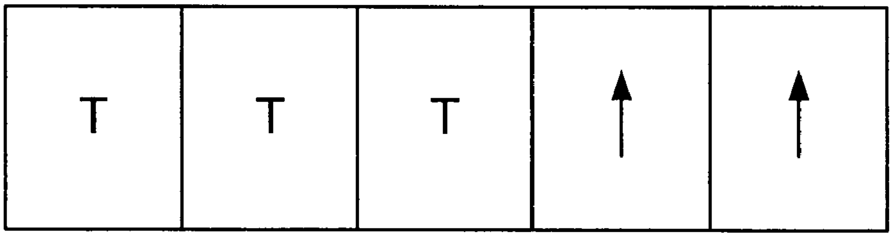

FIG. 3C illustrates that only the middle reel stopped on a T symbol during the free spin and that the occurrence of the new T symbol generated another free spin for the remaining reels. In another embodiment, only the fourth reel gets a free spin.

Figure 3D:
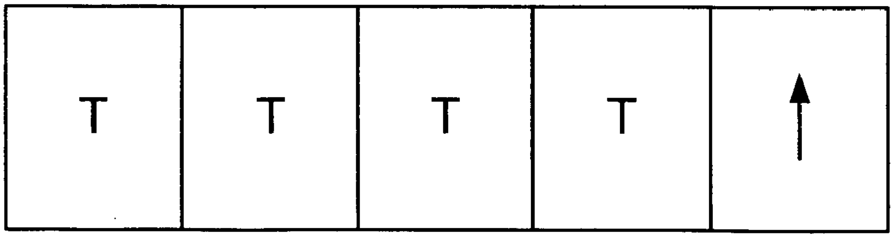

FIG. 3D illustrates that only the fourth reel stopped on a T symbol during the free spin and that the occurrence of the new T symbol generated another spin for the remaining reel. In another embodiment, only the fifth reel gets a free spin.

Figure 3E:
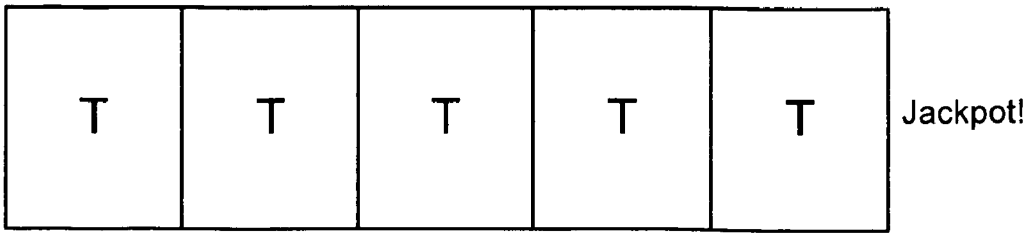

FIG. 3E illustrates that the fifth reel stopped on a T symbol, causing the player to win the jackpot award for five T symbols.

This concept of providing free spins for displaying certain symbols and holding the reels that display the certain symbols can be applied to any symbols in any position across a payline. The jackpots awarded for the trigger symbol combinations may be progressive jackpots accumulated by a plurality of interconnected gaming machines or may be fixed jackpot awards.

Figure 5:
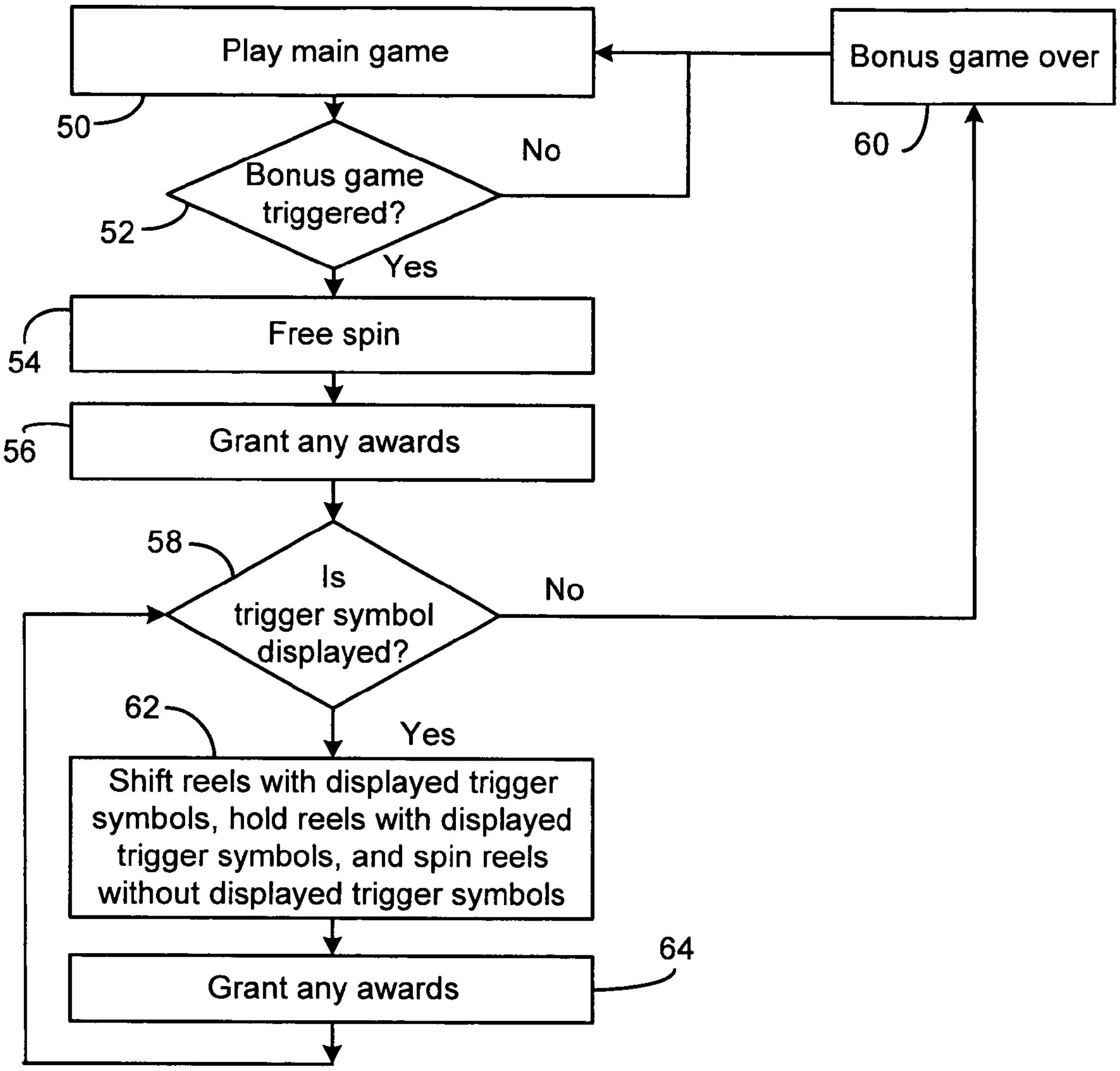
FIG. 5 is a flowchart of the method illustrated by FIGS. 4A-4D.

FIGS. 4A-4D illustrate another embodiment of the invention, and FIG. 5 is a flowchart of the method illustrated by FIGS. 4A-4D. FIGS. 4A-4D are video screen displays.

In step 50 of FIG. 5, after the player bets one or more credits, the main game is played using virtual or motor-driven reels. It is assumed the symbols on the reels create a 3×5 matrix of symbols but other configurations, such as a 3×3 array, may be used.

In step 52, it is determined if the main game result triggers the bonus game. The trigger may be a special outcome of the main game such as a certain combination of symbols or a special symbol. If the bonus game is not triggered, the main game is played again. If the bonus game is triggered, the player gets a free spin in step 54. The player may press a button for the free spin or the free spin may occur automatically. FIG. 4A illustrates a sample outcome of the free spin, where the displayed symbols are represented by letters.

In step 56, an award is granted to the player for any winning symbol combinations in the free spin.

In step 58, it is determined whether any trigger symbols are displayed as a result of the free spin. In the example of FIG. 4A, the trigger symbol is T1, and it is displayed on the first reel, middle position. If there were no trigger symbols displayed, the bonus game would be over (step 60). The trigger symbol T1 may be a scatter symbol, where the T1 symbol is applicable even if it appears on a payline not activated by the player with an enhanced wager. A scatter symbol may also be combined with symbols on other paylines to pay an award. The T1 symbol may be a wild card symbol or any other symbol.

As a result of the trigger symbol T1 being displayed, the player gets another free spin. In step 62, the reel 1 is shifted one vertical position upwards or downward and then held in position, and the reels 2-5 are spun. FIG. 4B is an example of the outcome of the second free spin. In step 64, any awards are paid.

The process then goes back to step 58, where it is determined if any trigger symbols are still displayed after the free spin.

In step 62, it is again determined that the trigger symbol T1 is still displayed by reel 1. Any reel displaying a trigger symbol (e.g., reel 1) is then shifted one position, and all reels that do not currently display a trigger symbol are spun. Since the shift of the reel 1 after the display in FIG. 4B caused the trigger symbol to shift off the screen, the reel 1 is spun along with the other reels 2-5.

FIG. 4C is an example of the outcome from the free spin. A new trigger symbol T2 is displayed on reel 5. Any awards are then granted.

Reel 5 is then shifted one position and held in place, and reels 1-4 are spun. FIG. 4D is an example of the outcome of the free spin. Any awards for winning symbol combinations are paid.

The process of shifting, holding, and respinning continues until there are no more trigger symbols displayed. In another embodiment, the determination of whether there is a displayed trigger symbol in step 58 is performed before the shift.

The direction of the shift or nudge can be up or down or to the sides. The player could be allowed to determine the direction of the movement to a certain extent. The nudge of the reel with the trigger symbol may happen before, during or after the other reels spin. In a video version, the trigger symbol may be shifted independently of the reels.

Although a stand-alone gaming machine has been described in detail, any type of device having a suitable display may be used to display the game, such as a personal computer, a cell phone, a personal digital assistant, etc.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A gaming method comprising:

a. placing a wager to play a game;

b. under the control of a processing unit, initiating a display of a plurality of spinning reels, each reel having a plurality of symbols on its periphery where one or more of the reels have one or more trigger symbols on its periphery as a subset of the plurality of symbols, and stopping the spinning reels to display a symbol combination, the plurality of reels displaying a single M×N array of symbols, forming a subset of the plurality of symbols on each reel, when stopped;

c. under the control of the processing unit, upon displaying one or more of the trigger symbols on the plurality of reels when the reels are stopped, proceeding to steps d through i;

d. shifting the stopped reels displaying a trigger symbol by one position;

e. holding the reels in the plurality of reels that still display the trigger symbols, where reels that have not been held being remaining reels;

f. giving a player a free spin by only rotating and stopping one or more of the remaining reels in the plurality of reels without requiring an additional wager;

g. granting an award for winning combinations of symbols after step f;

h. detecting the display of any trigger symbols in the M×N array after step f; and i. repeating steps d through h until no trigger symbols are displayed after the free spin.

2. The method of claim 1 wherein, step d comprises: shifting only the reels that have displayed the trigger symbol prior to the previous spin by one position;

step e comprises: holding the reels that still display the trigger symbols, and;

step f comprises: giving the player the free spin by rotating and stopping one or more of the remaining reels without requiring the additional wager.

3. The method of claim 1 where step d comprises shifting reels displaying the trigger symbol by one position upwards.

4. The method of claim 1 where step d comprises shifting reels displaying the trigger symbol by one position downwards.

5. The method of claim 1 wherein the plurality of spinning reels are displayed on a video screen.

6. The method of claim 1 wherein the plurality of spinning reels comprises physical spinning reels.

7. The method of claim 1 wherein M and N are each 3 or greater.

8. The method of claim 1 wherein step g further comprises, awarding a jackpot to the player when a predetermined number of the trigger symbols are displayed.

9. A gaming device comprising:

a display area for displaying a plurality of spinning and stopped reels; and a processor programmed for carrying out the following process:

a. initiating a display of a plurality of spinning reels, each reel having a plurality of symbols on its periphery where one or more of the reels have one or more trigger symbols on its periphery as a subset of the plurality of symbols, and stopping the spinning reels to display a symbol combination, the plurality of reels displaying a single M×N array of symbols, forming a subset of the plurality of symbols on each reel, when stopped;

b. upon displaying one or more of the trigger symbols on the plurality of stopped reels after a previous spin, proceeding to steps c through h;

c. shifting the stopped reels displaying a trigger symbol by one position;

d. holding the reels in the plurality of reels that still display the trigger symbols, where reels that have not been held being remaining reels;

e. giving a player a free spin by only rotating and stopping one or more of the remaining reels in the plurality of reels without requiring an additional wager;

f. granting an award for winning combinations of symbols after step e;

g. detecting the display of any trigger symbols in the M×N array after step e; and h. repeating steps c through g until no trigger symbols are displayed after the free spin.

10. The device of claim 9 wherein step c comprises: shifting only the reels that have displayed the trigger symbol prior to the previous spin by one position;

step d comprises: holding the reels that still display the trigger symbols, and;

step e comprises: giving the player the free spin by rotating and stopping one or more of the remaining reels without requiring the additional wager.

11. The device of claim 9 wherein the display area is a video screen.

12. The device of claim 9 wherein M and N are each 3 or greater.

13. A gaming method comprising:

a. placing a wager to play a game;

b. under the control of a processing unit, initiating a display of a plurality of spinning reels, each reel having a plurality of symbols on its periphery where one or more of the reels have one or more trigger symbols on its periphery as a subset of the plurality of symbols, and stopping the spinning reels to display an initial symbol combination, symbols on the plurality of reels displaying a single M×N array of symbols, forming a subset of the plurality of symbols on each reel, when stopped;

c. under the control of the processing unit, as a result of displaying one or more of the predetermined trigger symbols on the plurality of reels when the reels are stopped, and without an election of reels by a player, proceeding to steps d through g;

d. holding the stopped reels in the plurality of reels that display trigger symbols, where reels that have not been held being remaining reels;

e. giving the player a free spin by only rotating and stopping one or more of the remaining reels in the plurality of reels without requiring an additional wager;

f. detecting the display of one or more additional trigger symbols in the M×N array after step e; and g. repeating steps d through f until no additional trigger symbols are displayed after the free spin.

14. The method of claim 13 wherein step c comprises:

under the control of the processing unit, as a result of displaying a plurality of adjacent trigger symbols on the plurality of reels, and without an election of reels by a player, proceeding to steps d through g.

15. The method of claim 14 wherein step c comprises:

under the control of the processing unit, as a result of displaying a plurality of adjacent trigger symbols on the plurality of reels beginning at a first or last reel, and without an election of reels by a player, proceeding to steps d through g.

16. The method of claim 14 wherein step c comprises:

under the control of the processing unit, as a result of displaying a plurality of adjacent trigger symbols on the plurality of reels beginning from a leftmost reel, and without an election of reels by a player, proceeding to steps d through g.

17. The method of claim 13 wherein step f comprises detecting the display of one or more additional trigger symbols that are adjacent the trigger symbols displayed in step b.

18. The method of claim 13 further comprising granting awards for winning symbols combinations after each spin.

19. The method of claim 13 wherein step b comprises initiating the display of three spinning reels and stopping the spinning reels.

20. The method of claim 13 wherein step b comprises initiating the display of five spinning reels and stopping the spinning reels.

21. The method of claim 13 further comprising granting a jackpot award for the display of a particular combination of trigger symbols, wherein a different jackpot award is granted for different combinations of trigger symbols.

22. The method of claim 13 further comprising granting a jackpot award for the display of a number of trigger symbols, where the number equals the number of reels.

23. The method of claim 13 further comprising granting awards for certain symbol combinations that extend from a leftmost reel to a rightmost reel.

24. The method of claim 13 wherein step b comprises initiating a video display of the plurality of spinning reels, each reel having the plurality of symbols on its periphery, and stopping the spinning reels to display the initial symbol combination.

25. The method of claim 13 wherein step b comprises initiating a display of a plurality of physical spinning reels, each reel having the plurality of symbols on its periphery, and stopping the spinning reels to display the initial symbol combination.

26. The method of claim 13 further comprising granting an award to the player based on a number of trigger symbols displayed.

27. A gaming method comprising:

a. placing a wager to play a game;

b. under the control of a processing unit, initiating a display of a plurality of spinning reels, each reel having a plurality of symbols on its periphery where one or more of the reels have one or more trigger symbols on its periphery as a subset of the plurality of symbols, and stopping the spinning reels to display an initial symbol combination, the plurality of reels displaying a single M×N array of symbols, forming a subset of the plurality of symbols on each reel, when stopped;

c. under the control of the processing unit, as a result of displaying one or more of the predetermined trigger symbols on the plurality of reels when the reels are stopped, and without an election of reels by a player, proceeding to step d;

d. holding the stopped reels in the plurality of reels that display trigger symbols, where reels that have not been held being remaining reels; and e. giving the player a number of free spins equal to the number of trigger symbols displayed by rotating and stopping one or more of the remaining reels in the plurality of reels without requiring an additional wager.

28. A gaming device comprising:

a display area for displaying a plurality of spinning and stopped reels, each reel having a plurality of symbols on its periphery where one or more of the reels have one or more trigger symbols on its periphery, as a subset of the plurality of symbols, the plurality of reels displaying a single M×N array of symbols, forming a subset of the plurality of symbols on each reel, when stopped; and a processor programmed for carrying out the following process:

a. as a result of displaying one or more of the trigger symbols on the plurality of reels when the reels are stopped, and without an election of reels by a player, proceeding to step b;

b. holding the stopped reels in the plurality of reels that display the predetermined trigger symbols, where reels that have not been held being remaining reels;

c. giving the player a free spin by only rotating and stopping one or more of the remaining reels in the plurality of reels without requiring an additional wager;

d. detecting a display of one or more additional trigger symbols in the M×N array after step c; and e. repeating steps b through d until no additional trigger symbols are displayed after the free spin.

29. The device of claim 28 wherein the display area is a video display.

30. The device of claim 28 wherein the processor is further programmed to grant awards for winning symbols combinations after an initial symbol combination and after each free spin.

* * * * *